United States Patent
Dong et al.

(10) Patent No.: US 9,097,133 B2
(45) Date of Patent: Aug. 4, 2015

(54) COMPRESSOR TIP CLEARANCE MANAGEMENT FOR A GAS TURBINE ENGINE

(75) Inventors: Yuan Dong, Glastonbury, CT (US); Lisa I. Brilliant, Middletown, CT (US); Daniel Carminati, Berlin, CT (US); Steven J. Sirica, Ellington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 540 days.

(21) Appl. No.: 13/487,632

(22) Filed: Jun. 4, 2012

(65) Prior Publication Data

US 2013/0323012 A1    Dec. 5, 2013

(51) Int. Cl.
| | |
|---|---|
| *F01D 11/20* | (2006.01) |
| *F01D 11/08* | (2006.01) |
| *F04D 27/00* | (2006.01) |
| *F04D 29/16* | (2006.01) |
| *F04D 29/56* | (2006.01) |
| *F02C 9/20* | (2006.01) |
| *F04D 27/02* | (2006.01) |

(52) U.S. Cl.
CPC . *F01D 11/08* (2013.01); *F02C 9/20* (2013.01); *F04D 27/004* (2013.01); *F04D 27/0246* (2013.01); *F04D 29/164* (2013.01); *F04D 29/563* (2013.01)

(58) Field of Classification Search
CPC ......... F01D 11/08; F01D 11/14; F01D 11/20; F01D 11/22; F04D 27/004; F04D 27/0246; F04D 29/164; F04D 29/563; F02C 9/20
USPC ...................................... 415/160, 161, 173.1
See application file for complete search history.

(56) References Cited

U.S. PATENT DOCUMENTS

| | | | |
|---|---|---|---|
| 5,165,845 A * | 11/1992 | Khalid | ............................ 415/17 |
| 5,282,718 A | 2/1994 | Koff et al. | |
| 6,155,038 A | 12/2000 | Irwin et al. | |
| 6,164,902 A | 12/2000 | Irwin et al. | |
| 6,231,306 B1 * | 5/2001 | Khalid | ............................ 416/26 |
| 6,823,675 B2 | 11/2004 | Brunell et al. | |

(Continued)

FOREIGN PATENT DOCUMENTS

| | | |
|---|---|---|
| JP | 2003-166500 A | 6/2003 |
| WO | 95 10692 | 4/1995 |

OTHER PUBLICATIONS

International Search Report for PCT Application No. PCT/US2013/041606, Jul. 26, 2013.

(Continued)

*Primary Examiner* — Liam McDowell
(74) *Attorney, Agent, or Firm* — Carlson, Gaskey & Olds, P.C.

(57) ABSTRACT

A compressor tip clearance management system includes a compressor section having a low pressure compressor and a high pressure compressor arranged downstream from the low pressure compressor. A variable stator vane is arranged upstream from the high pressure compressor. The variable stator vane is connected to an actuator, and a controller is in communication with the actuator. The controller is configured to provide a command to the actuator to move the variable stator vane in response to a high pressure compressor clearance condition. A high pressure compressor rotor speed is altered, and the high pressure compressor clearance condition is changed to a desired clearance.

15 Claims, 2 Drawing Sheets

(56) References Cited

U.S. PATENT DOCUMENTS

| | | |
|---|---|---|
| 6,935,119 B2 | 8/2005 | Placko et al. |
| 7,198,454 B2 | 4/2007 | Evans |
| 7,260,892 B2 | 8/2007 | Schilling et al. |
| 8,011,883 B2 | 9/2011 | Schwarz et al. |
| 8,126,628 B2 | 2/2012 | Hershey et al. |
| 8,740,547 B2 * | 6/2014 | Colotte et al. .................. 415/36 |
| 2005/0081509 A1 * | 4/2005 | Johnson ....................... 60/226.1 |
| 2006/0140756 A1 | 6/2006 | Schwarz et al. |
| 2006/0242941 A1 | 11/2006 | Johnson |
| 2009/0155072 A1 * | 6/2009 | Winter .......................... 415/220 |
| 2010/0021285 A1 | 1/2010 | Rowe et al. |
| 2010/0196137 A1 | 8/2010 | Horn et al. |

OTHER PUBLICATIONS

International Preliminary Report on Patentability for International Application No. PCT/US2013/041606 mailed Dec. 18, 2014.

\* cited by examiner

COMPRESSOR TIP CLEARANCE MANAGEMENT FOR A GAS TURBINE ENGINE

BACKGROUND

This disclosure relates to a compressor tip management system and a method for controlling the tip clearance in a high pressure compressor.

One type of gas turbine engine includes a two-spool arrangement having low and high compressor sections. The low pressure compressor section may include a variable guide vane. Alternatively or additionally, a variable inlet guide vane may also be arranged upstream from the low pressure compressor section. The variable guide vanes arranged upstream from the high pressure compressor section are varied to adjust the low pressure compressor characteristics, but not the high pressure compressor characteristics. The variable guide vanes are adjusted only to provide a desirable operating line and stall margin for the low pressure compressor section.

SUMMARY

In one exemplary embodiment, a method of managing a tip clearance in a high pressure compressor includes the steps of identifying a high pressure compressor clearance condition, and adjusting a variable stator vane arranged upstream from the high pressure compressor, thereby altering a high pressure compressor rotor speed with the variable stator vane for changing the high pressure compressor clearance condition.

In a further embodiment of the above, the high pressure compressor clearance condition corresponds to a clearance between an engine static structure and high pressure compressor rotor blade tips that are outside a predetermined clearance range.

In a further embodiment of the above, the high pressure compressor clearance condition is a tip clearance that is less than a predetermined minimum clearance, thereby anticipating a blade rub condition. The adjusting step includes the step of closing the variable stator vanes, thereby decreasing the high pressure compressor rotor speed for increasing clearance between the engine static structure and the high pressure compressor rotor blade tips.

In a further embodiment of the above, the high pressure compressor clearance condition is a tip clearance that is greater than a predetermined maximum clearance. The adjusting step includes opening the variable stator vanes, thereby increasing the high pressure compressor rotor speed for decreasing clearance between the engine static structure and the high pressure compressor rotor blade tips.

In a further embodiment of the above, a tip clearance is electronically calculated, by a controller, based on predictive determinations and/or sensed conditions of the high pressure compressor.

In another exemplary embodiment, a compressor tip clearance management system includes a compressor section that includes a low pressure compressor and a high pressure compressor arranged downstream from the low pressure compressor. A variable stator vane is arranged upstream from the high pressure compressor. The variable stator vane is connected to an actuator. An electronic controller is in communication with the actuator. The controller is configured to command the actuator to move the variable stator vane in response to a high pressure compressor clearance condition, to thereby alter a high pressure compressor rotor speed and change the high pressure compressor clearance condition.

In a further embodiment of the above, the system includes an engine static structure. The high pressure compressor clearance condition corresponds to a clearance between an engine static structure and high pressure compressor rotor blade tips that is outside a predetermined clearance range.

In a further embodiment of the above, the high pressure compressor clearance condition is a tip clearance that is less than a predetermined minimum clearance, thereby anticipating a blade rub condition. The controller command closes the variable stator vane, thereby decreasing the high pressure compressor rotor speed and increasing clearance between the engine static structure and the high pressure compressor rotor blade tips.

In a further embodiment of the above, the high pressure compressor clearance condition is a tip clearance that is greater than a predetermined maximum clearance. The controller command opens the variable stator vanes, thereby increasing the high pressure compressor rotor speed and decreasing clearance between the engine static structure and the high pressure compressor rotor blade tips.

In a further embodiment of the above, the controller communicates with an electronic clearance control module that determines the high pressure compressor clearance condition, based on predictive determinations and/or sensed conditions of the high pressure compressor.

In a further embodiment of the above, the system includes sensors in communication with the controller that are configured to provide characteristics relating to the high pressure compressor.

In a further embodiment of the above, at least one of the sensors is a rotational speed sensor. The high pressure compressor condition is predicted based on the sensed rotational speed of the high pressure compressor.

In a further embodiment of the above, the system includes plural shafts, including an inner shaft and an outer shaft. The low pressure compressor and the high pressure compressor are respectively mounted to the inner and outer shafts.

In a further embodiment of the above, the system includes a fan section. A geared architecture operatively couples the inner shaft to the fan section.

In a further embodiment of the above, the fan section is arranged in a bypass flow path and is configured to provide a bypass ratio greater than six. The geared architecture provides a gear reduction ratio of at least 2.3.

BRIEF DESCRIPTION OF THE DRAWINGS

The disclosure can be further understood by reference to the following detailed description when considered in connection with the accompanying drawings wherein.

DETAILED DESCRIPTION

Figure 1:
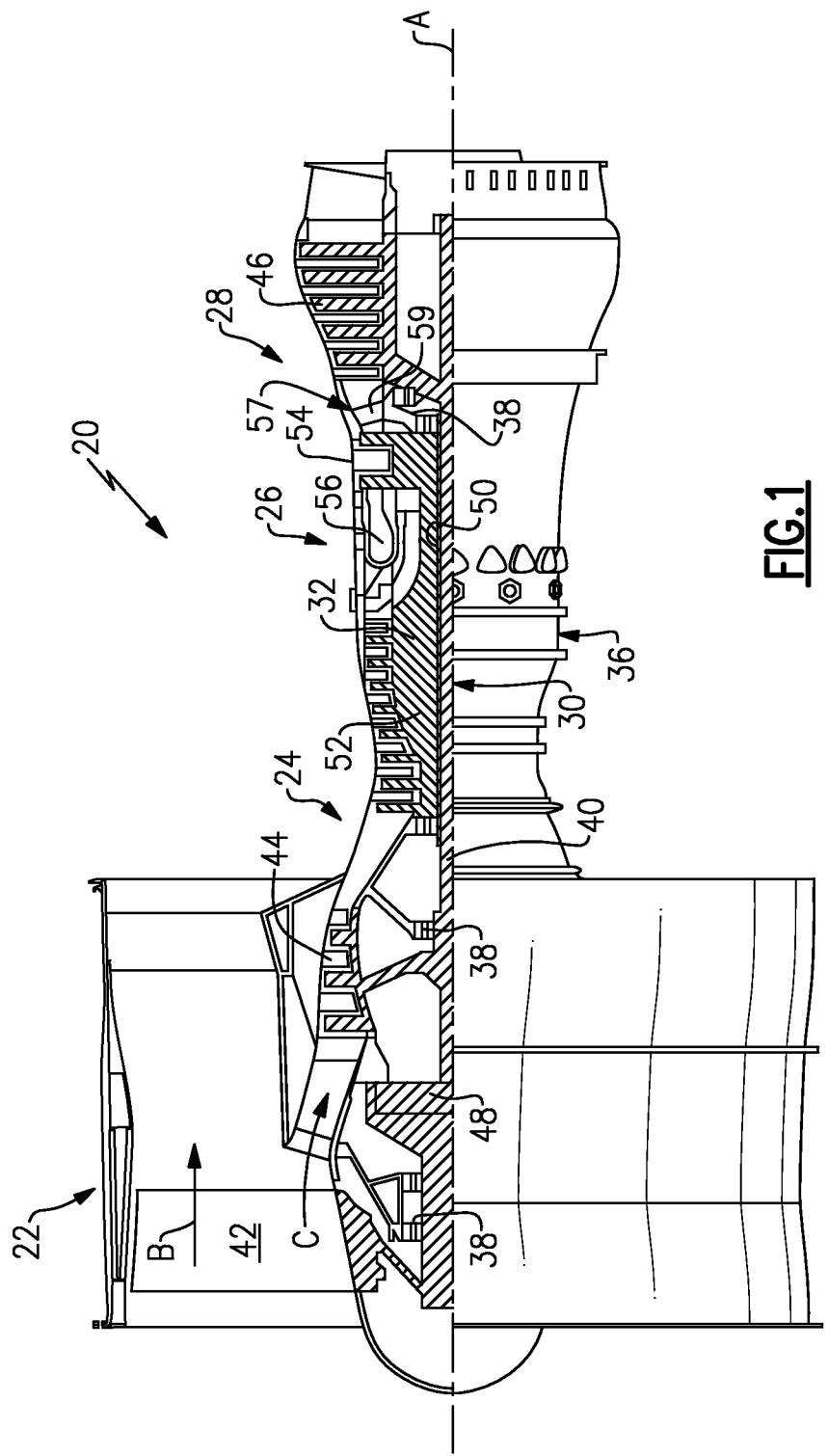
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. The low pressure turbine 46 pressure ratio is pressure measured prior to the inlet of the low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned per hour divided by 1 bf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram} \deg R)/518.7)^{\wedge}0.5]$. The "Low corrected fan tip speed" as disclosed herein according to one non-limiting embodiment is less than about 1150 ft/second.

Figure 2:
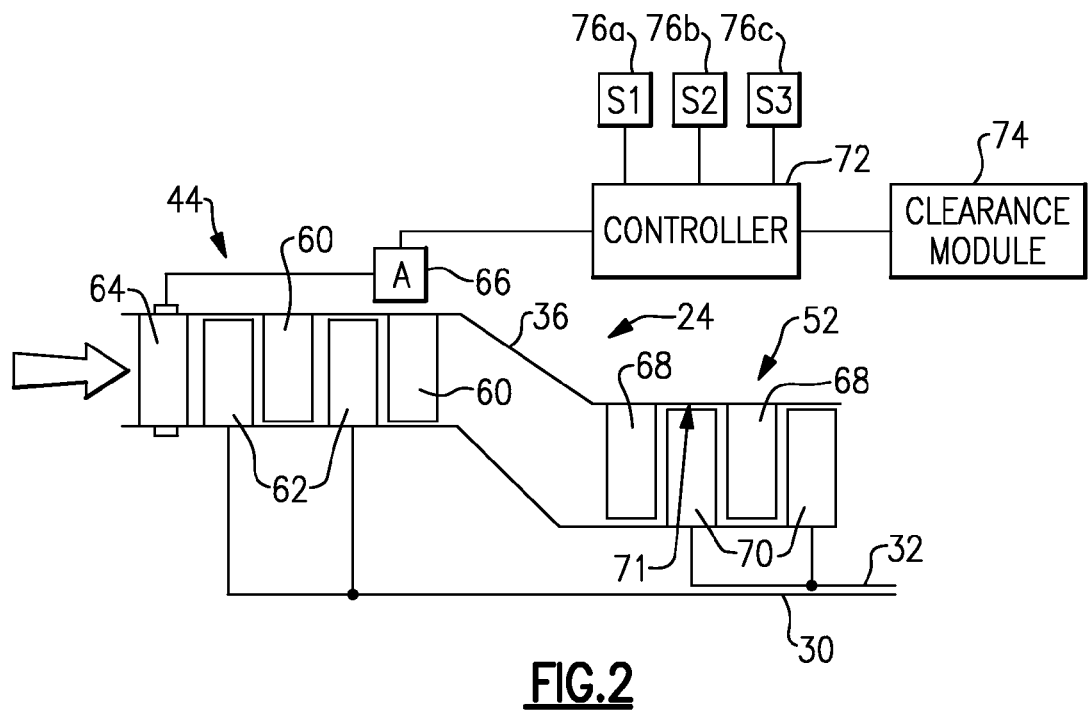
FIG. 2 is a highly schematic view of a compressor section of a gas turbine engine.

FIG. 2 illustrates a highly schematic compressor tip clearance management system for a compressor section 24 of a gas turbine engine 20. The system may be particularly beneficial for two-spool gas turbine engines having a geared architecture since such an arrangement may provide an operating condition where the high pressure compressor 52 is operating at high power while the low pressure compressor 44 is operating generally at idle. However, it should be understood that the system may be suitable for other types of engine configurations.

In the example, the low pressure compressor 44 includes multiple low pressure compressor stator vanes 60. Low pressure compressor rotor blades 62 are mounted to the low spool 30 and are arranged axially between the low pressure stator vanes 60. A variable stator vane 64 is arranged upstream from the high pressure compressor 52. In the example, the variable stator vane 64 is provided in the low pressure compressor 44. An actuator 66 is coupled to the variable stator vanes 64 to rotate the stator vanes 64 about their radial axes. The high pressure compressor 52 includes multiple high pressure compressor stator vanes 68. High pressure compressor rotor blades 70 are mounted to the high spool 32. The engine static structure 36 includes blade outer air seals having rub strips (not illustrated). The distance between the rub strips and the tips of the high pressure compressor rotor blades 70 determines the tip clearance in the high pressure compressor 52.

A controller 72 communicates with the actuator 66 and with a clearance control module 74, which may be integral with or separate from the controller 72. The clearance control module 74 may include algorithms that rely upon real-time data and/or information determined empirically during test procedures. That is, the clearance control module may provide the actual or predicted tip clearance 71 (or a combination of actual and predicted tip clearance 71) in the high pressure compressor 52. Multiple sensors 76A, 76B, 76C (collectively, "sensors 76"), for example, are in communication with the controller 72. The sensors 76 may correspond to temperature, speed or pressure sensors relating to the characteristics of the low and high pressure compressors 44, 52, for example. In one example, the sensors 76 provide information relating to the high pressure compressor 52 speed and temperature, which are indicative of the tip clearance 71 between the high pressure compressor rotor blades 70 and the rub strips.

Figure 3:
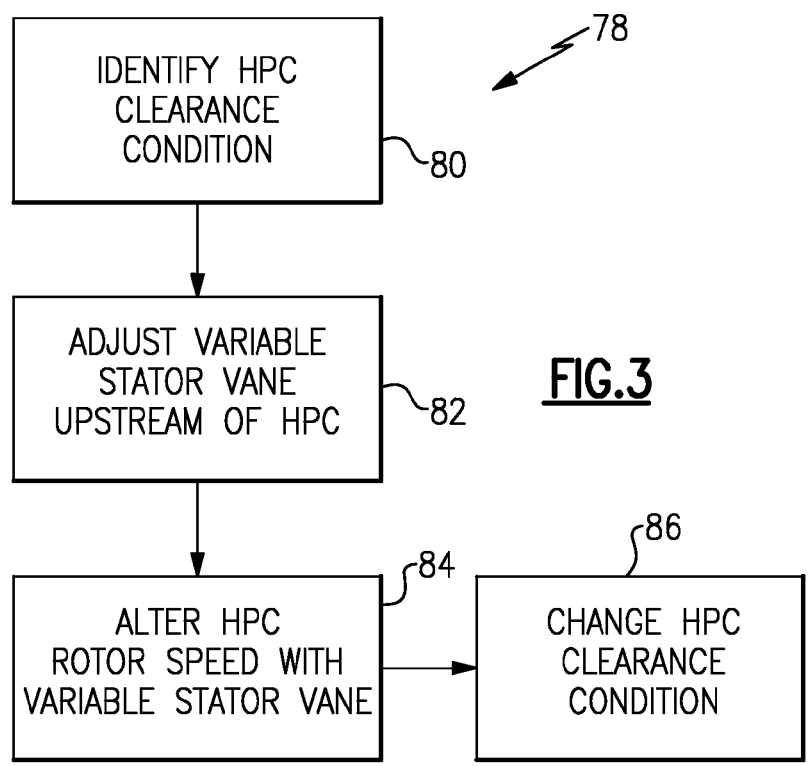
FIG. 3 is a flow chart depicting an example compressor tip clearance management method.

The controller 72 is configured to provide a command to the actuator 66 to vary the angular position of the variable stator vanes 64 and change the high pressure compressor tip clearance 71. Referring to FIG. 3, a compressor tip clearance management method 78 includes identifying a high pressure compressor tip clearance condition, as indicated at block 80. The tip clearance condition may correspond to undesired rub during a transient condition, for example, due to the speed at which the high pressure compressor rotates during a transient temperature.

The controller 72 commands the actuator 66 to adjust the variable stator vanes 64, as indicated by block 82. For example, if an undesired rub is anticipated, the controller 72 will command the variable stator vanes 64 to close to reduce the speed of the high pressure compressor 52, which will increase the tip clearance due to the reduce centrifugal forces. If the tip clearance is too large, which reduces efficiency, the variable stator vanes 64 can be opened to increase the speed of the high pressure compressor 52, which cause the tips to move radially outward due to centrifugal forces. Thus, the high pressure compressor rotor speed is altered, as indicated at block 84, to change the high pressure compressor clearance condition, as indicated at block 86.

In other words, the controller can be preprogrammed to calculate blade tip clearance based on predictive technology and/or sensed data for the high pressure compressor. With this information, the controller is capable of determining: (1) when a rub condition is going to occur because the tip clearance is too small, i.e., less than a predetermined minimum clearance in a predetermined clearance range; and (2) whether inefficiencies are going to occur because the tip clearance is too large, i.e., greater than a predetermined maximum clearance in a predetermined clearance range. The actions of the controller to the variable stator vanes substantially mitigate the identified problems.

It should be noted that the controller 72 and clearance control module 74 are control devices that may be provided by hardware and/or software. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The hardware device may execute software, particularly software stored in memory. The hardware can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Although an example embodiment has been disclosed, a worker of ordinary skill in this art would recognize that certain modifications would come within the scope of the claims. For that reason, the following claims should be studied to determine their true scope and content.

What is claimed is:

1. A method of managing a tip clearance in a high pressure compressor on a high spool, wherein a low spool includes a low pressure compressor, comprising the steps of:
   identifying a high pressure compressor clearance condition; and
   adjusting a variable stator vane arranged upstream from the high pressure compressor and in the low pressure compressor;
   thereby altering a high pressure compressor rotor speed with the variable stator vane for changing the high pressure compressor clearance condition.

2. The method according to claim 1, wherein the high pressure compressor clearance condition corresponds to a clearance between an engine static structure and high pressure compressor rotor blade tips that is outside a predetermined clearance range.

3. The method according to claim 2, wherein a tip clearance is electronically calculated, by a controller, based on predictive determinations and/or sensed conditions of the high pressure compressor.

4. A method of managing a tip clearance in a high pressure compressor on a high spool, wherein a low spool includes a low pressure compressor, comprising the steps of:
   identifying a high pressure compressor clearance condition;
   adjusting a variable stator vane arranged upstream from the high pressure compressor and in the low pressure compressor;
   thereby altering a high pressure compressor rotor speed with the variable stator vane for changing the high pressure compressor clearance condition;
   the high pressure compressor clearance condition corresponds to a clearance between an engine static structure and high pressure compressor rotor blade tips that is outside a predetermined clearance range;
   the high pressure compressor clearance condition is a tip clearance that is less than a predetermined minimum clearance, thereby anticipating a blade rub condition; and
   the adjusting step includes the step of closing the variable stator vanes;
   thereby decreasing the high pressure compressor rotor speed for increasing clearance between the engine static structure and the high pressure compressor rotor blade tips.

5. A method of managing a tip clearance in a high pressure compressor on a high spool, wherein a low spool includes a low pressure compressor, comprising the steps of:
   identifying a high pressure compressor clearance condition;
   adjusting a variable stator vane arranged upstream from the high pressure compressor and in the low pressure compressor;
   thereby altering a high pressure compressor rotor speed with the variable stator vane for changing the high pressure compressor clearance condition;
   the high pressure compressor clearance condition corresponds to a clearance between an engine static structure and high pressure compressor rotor blade tips that is outside a predetermined clearance range;
   the high pressure compressor clearance condition is a tip clearance that is greater than a predetermined maximum clearance; and
   the adjusting step includes opening the variable stator vanes;

thereby increasing the high pressure compressor rotor speed for decreasing clearance between the engine static structure and the high pressure compressor rotor blade tips.

6. A compressor tip clearance management system comprising:
   a compressor section including a low pressure compressor and a high pressure compressor arranged downstream from the low pressure compressor;
   a variable stator vane arranged upstream from the high pressure compressor and in the low pressure compressor, the variable stator vane connected to an actuator; and
   an electronic controller in communication with the actuator, the controller configured to command the actuator to move the variable stator vane in response to a high pressure compressor clearance condition, to thereby alter a high pressure compressor rotor speed and change the high pressure compressor clearance condition.

7. The system according to claim 6, comprising:
   an engine static structure; and
   the high pressure compressor clearance condition corresponds to a clearance between an engine static structure and high pressure compressor rotor blade tips that is outside a predetermined clearance range.

8. The system according to claim 6, wherein:
   the controller communicates with an electronic clearance control module that determines the high pressure compressor clearance condition, based on predictive determinations and/or sensed conditions of the high pressure compressor.

9. The system according to claim 8, comprising sensors in communication with the controller configured to provide characteristics relating to the high pressure compressor.

10. The system according to claim 9, wherein:
    at least one of said sensors is a rotational speed sensor; and
    the high pressure compressor condition is predicted based on the sensed rotational speed of the high pressure compressor.

11. The system according to claim 6, comprising:
    plural shafts, including an inner shaft and an outer shaft; and
    the low pressure compressor and the high pressure compressor are respectively mounted to the inner and outer shafts.

12. The system according to claim 11, comprising:
    a fan section; and
    a geared architecture operatively coupling the inner shaft to the fan section.

13. The system according to claim 12, wherein:
    the fan section is arranged in a bypass flow path and is configured to provide a bypass ratio greater than six, and the geared architecture provides a gear reduction ratio of at least 2.3.

14. A compressor tip clearance management system comprising:
    a compressor section including a low pressure compressor and a high pressure compressor arranged downstream from the low pressure compressor;
    a variable stator vane arranged upstream from the high pressure compressor and in the low pressure compressor, the variable stator vane connected to an actuator;
    an electronic controller in communication with the actuator, the controller configured to command the actuator to move the variable stator vane in response to a high pressure compressor clearance condition, to thereby alter a high pressure compressor rotor speed and change the high pressure compressor clearance condition;
    an engine static structure;
    the high pressure compressor clearance condition corresponds to a clearance between an engine static structure and high pressure compressor blade tips that is outside a predetermined clearance range;
    the high pressure compressor clearance condition is a tip clearance that is less than a predetermined minimum clearance, thereby anticipating a blade rub condition; and
    the controller command closes the variable stator vane, thereby decreasing the high pressure compressor rotor speed and increasing clearance between the engine static structure and the high pressure compressor rotor blade tips.

15. A compressor tip clearance management system comprising:
    a compressor section including a low pressure compressor and a high pressure compressor arranged downstream from the low pressure compressor;
    a variable stator vane arranged upstream from the high pressure compressor and in the low pressure compressor, the variable stator vane connected to an actuator;
    an electronic controller in communication with the actuator, the controller configured to command the actuator to move the variable stator vane in response to a high pressure compressor clearance condition, to thereby alter a high pressure compressor rotor speed and change the high pressure compressor clearance condition;
    an engine static structure;
    the high pressure compressor clearance condition corresponds to a clearance between an engine static structure and high pressure compressor rotor blade tips that is outside a predetermined clearance range;
    the high pressure compressor clearance condition is a tip clearance that is greater than a predetermined maximum clearance; and
    the controller command opens the variable stator vanes, thereby increasing the high pressure compressor rotor speed and decreasing clearance between the engine static structure and the high pressure compressor rotor blade tips.

* * * * *

UNITED STATES PATENT AND TRADEMARK OFFICE
CERTIFICATE OF CORRECTION

| | | |
|---|---|---|
| PATENT NO. | : 9,097,133 B2 | Page 1 of 1 |
| APPLICATION NO. | : 13/487632 | |
| DATED | : August 4, 2015 | |
| INVENTOR(S) | : Yuan Dong et al. | |

It is certified that error appears in the above-identified patent and that said Letters Patent is hereby corrected as shown below:

IN THE CLAIMS:

In Claim 14, column 8, line 17; after "compressor" insert --rotor--

Signed and Sealed this
First Day of March, 2016

Michelle K. Lee
*Director of the United States Patent and Trademark Office*